Nov. 23, 1965   R. FIELDEN   3,219,249
APPARATUS FOR FORMING TUBES
Original Filed Nov. 9, 1960   2 Sheets-Sheet 1
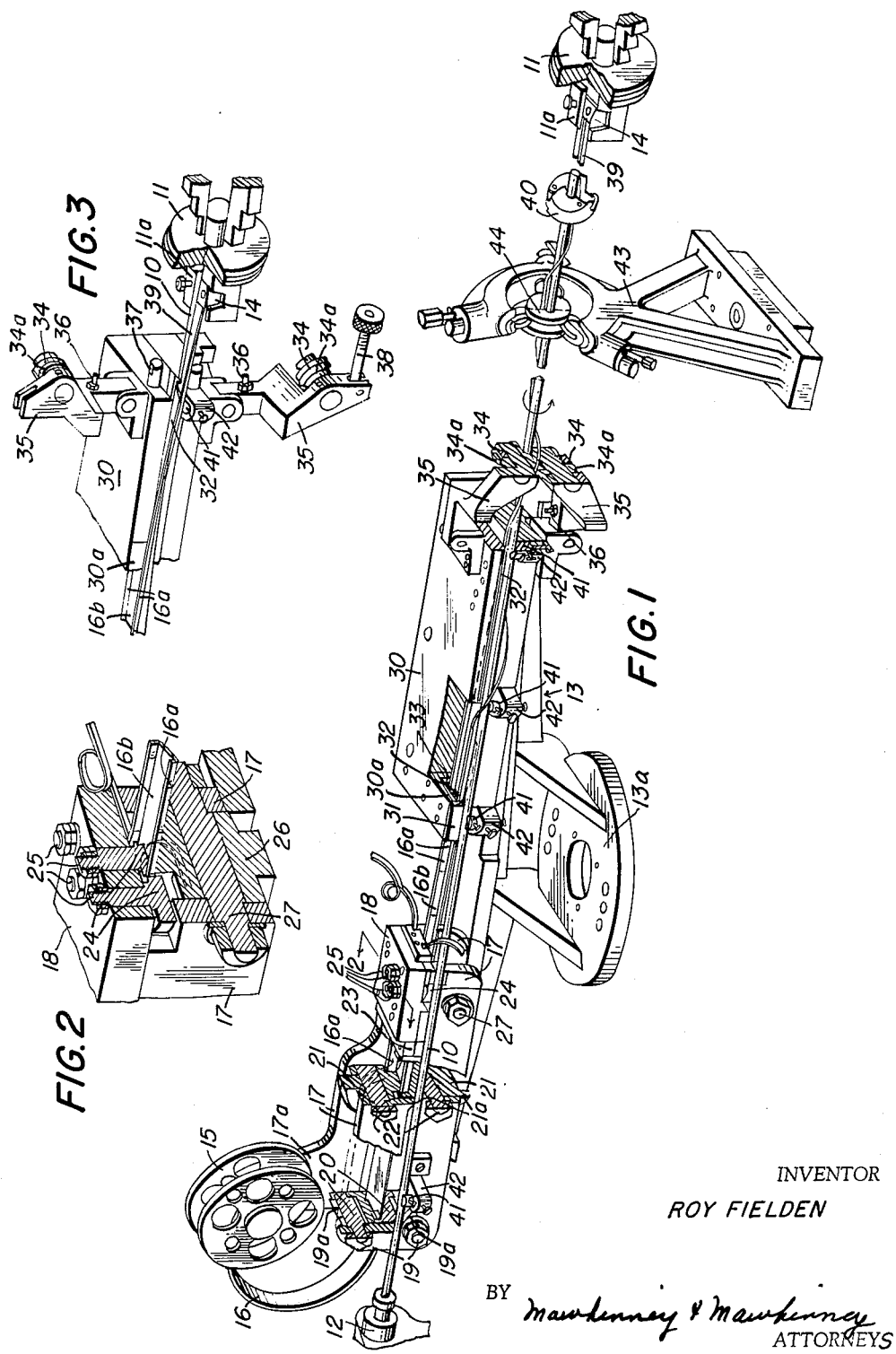
INVENTOR
ROY FIELDEN
BY Mawkenney & Mawkenney
ATTORNEYS

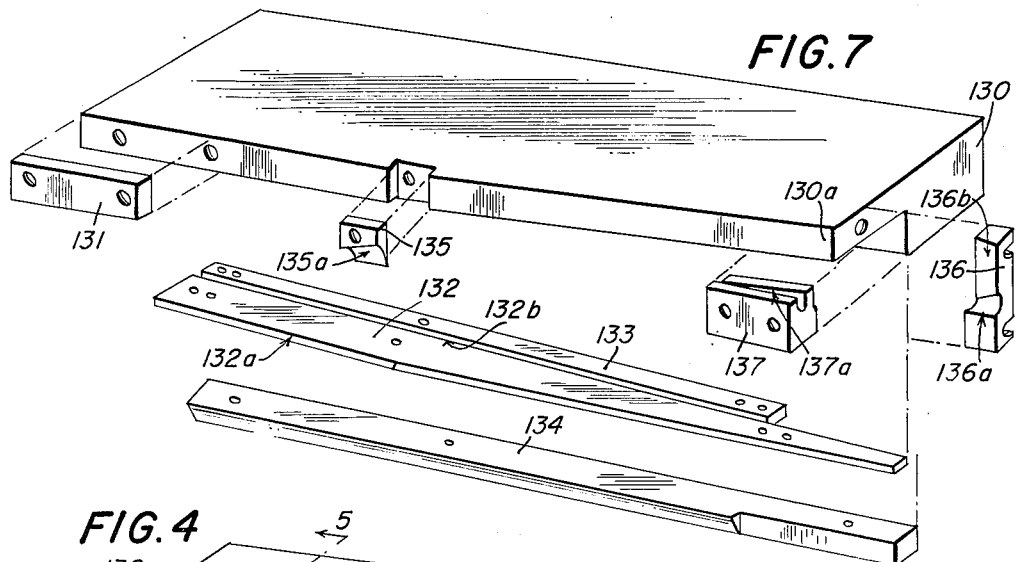
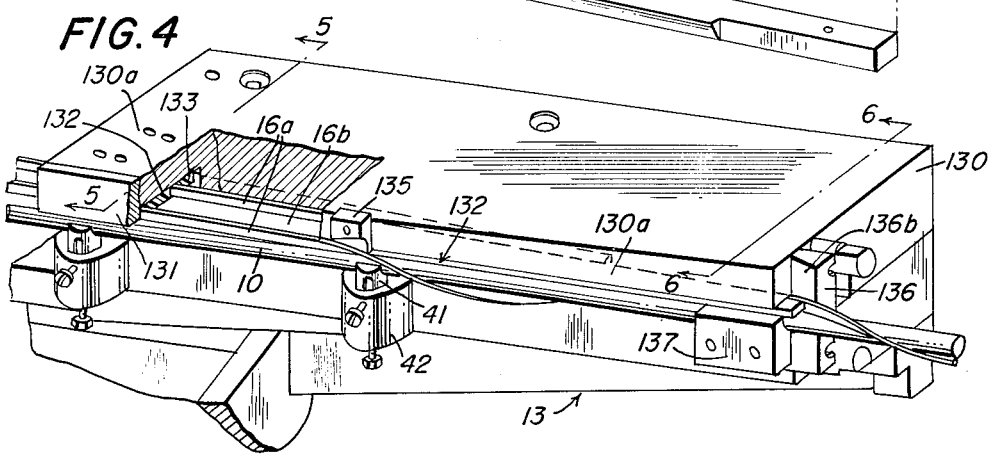
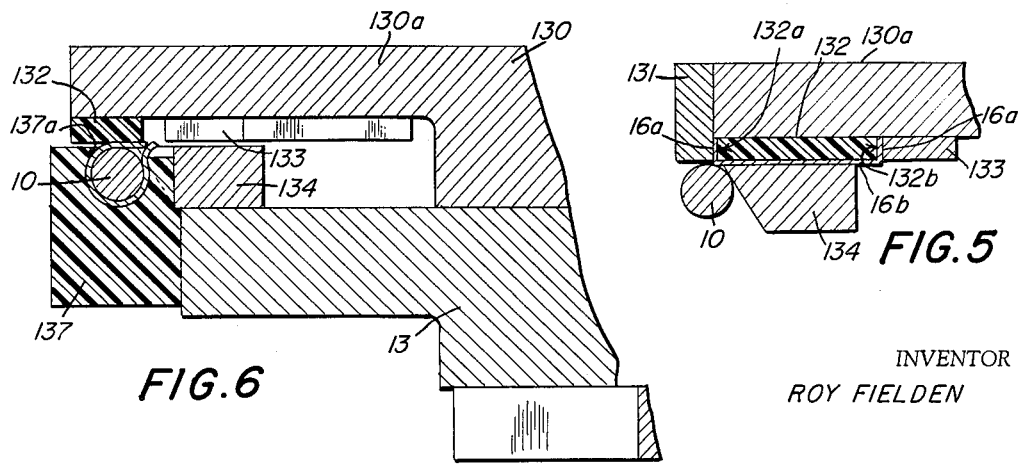

United States Patent Office 3,219,249
Patented Nov. 23, 1965

3,219,249
APPARATUS FOR FORMING TUBES
Roy Fielden, Skipton, England, assignor to Rolls-Royce Limited, Derby, England, a British company
Original application Nov. 9, 1960, Ser. No. 68,180, now Patent No. 3,152,567, dated Oct. 13, 1964. Divided and this application Nov. 24, 1961, Ser. No. 160,388
Claims priority, application Great Britain, Nov. 12, 1959, 38,485/59
7 Claims. (Cl. 228—15)

This application is a division of my application, Serial No. 68,180, filed November 9, 1960, now Patent No. 3,152,567.

This invention relates to the manufacture of tubes from strip metal, and more particularly the manufacture of tubes having an external helical fin.

According to the present invention, a tube having an external helical fin is manufactured from strip metal by giving the strip a channel section with a base and edge webs, wrapping the channel-section strip on a mandrel in a manner to bring the outer faces of the webs into contact, providing a helical twist in the strip and joining the webs together as by welding to form the fin.

According to the invention, a machine for manufacturing a tube having an external helical fin comprises a cylindrical mandrel supported to be rotated about its longitudinal axis, a clamp for one end of the strip mounted adjacent to but radially offset from one end of the mandrel and rotatable with the mandrel, a strip holder, a carriage mounted for movement parallel to the mandrel, means to form strip to a channel section mounted on the carriage at its end remote from the clamp and guide means to feed the channel-section strip at an angle over the mandrel, the guide means being mounted on the carriage at its end adjacent the clamp, whereby by rotation of the mandrel and the clamp, the latter gripping one end of the strip, and by simultaneous displacement of the carriage in a direction away from the clamp, strip is drawn from the holder through the channel forming means and the guide means to be wrapped around the mandrel to bring the outer surfaces of the webs of the channel section together.

Preferably, the strip holder is a reel mounted on the carriage at its end remote from the clamp.

If desired, the carriage may also have web-trimming means mounted on it between the channel forming means and the guide means so as to trim the webs to be of equal width.

Furthermore, if desired, welding apparatus may be provided between the carriage and clamp to weld the contacting webs together as the wrapped strip leaves the guide means.

One form of machine of this invention will now be described with reference to the accompanying drawings, in which—

FIGURE 1 shows the machine in perspective, parts being broken away to show constructional details, FIGURE 2 is a section on the line 2—2 of FIGURE 1, FIGURE 3 is a fragmentary view showing the positions of parts of the machine at the commencement of operation, FIGURE 4 illustrates an alternative construction of part of the machine, FIGURES 5 and 6 are sections on the lines 5—5 and 6—6 respectively, and FIGURE 7 is an exploded view of the parts of the machine shown in FIGURES 4 to 6.

The machine is of the lathe type and comprises a machine bed (not shown), a cylindrical rod-like mandrel 10 which is secured at one end by a clamp 11a is a driven head stock 11 for rotating the rod about its axis, and which is supported at its other end in a tail stock 12, the head and tail stocks 11, 12 being mounted on the machine bed, and a carriage 13 adapted by a base portion 13a to be mounted on a saddle which is traversed by a lead screw along the machine bed in a direction parallel to the mandrel 10.

The head stock 11 also has a clamp 14 by which one end of the strip 16 to be treated is gripped, the clamp 14 being radially offset from the axis of rotation of the head stock 11 and mandrel 10.

At its end remote from the head stock 11, the carriage 13 has mounted on it a structure (FIGURES 1 and 2) comprising a pair of side plates 17 which are joined at one end by a top plate 18 and at the opposite end by bolts 19 having shank portions 19a forming spacers for the side plates 17. One side plate 17 has an upwardly projecting lug 17a on which is mounted a reel 15 forming a holder for the strip metal 16.

The bolts 19 also retain in position a pair of guide blocks 20 between which the strip 16 passes after being drawn from the reel 15 and before being fed between a bank of channelling rollers 21 which are journalled in the side plates 17 by spindles 22. The lower roller 21 has end flanges 21a between which the upper roller 21 projects and in passing through the bite of the rollers 21 the edge portions of the strip 16 are turned upwardly by the flanges 21a to form webs 16a at right angles to the base portion 16b of the now channel-section strip.

A slotted guide 23 is secured to the side plates 17 to guide the channel-section strip from the channelling rollers 21 into two pairs of roller-type shears 24 (FIGURE 2) which trim the webs 16a to be of equal depth, the shear rollers being carried by spindles 25 journalled in the top plate 18. During shearing, the base portion 16b is supported by a roller 26 carried on a spindle 27 mounted in the side plates 17.

At its end nearer the head stock 11, the carriage 13 has mounted on it guide means which assist the operation of wrapping the channel-section strip on the mandrel 10. The guide means (FIGURES 1 and 3) comprises a block 30 having a heavy flange 30a overhanging the mandrel and channel-section strip, the flange 30a having secured to it a guide strip 31 which contacts the outer surface of one web 16a and which terminates part way along the block 30, a guide bar 32 which lies within the channel and gradually decreases in width towards the head stock 11, and a second guide bar 33 which contacts the outer surface of the other web 16a and extends part way only towards the head-stock end of the block 30.

The longitudinal centre line of the channel-section strip is a small angle to the mandrel 10 and thus by moving the carriage 13 away from the head stock 11 whilst simultaneously rotating the mandrel 10 and the end of the strip which is secured by the clamp 14, the channel-section strip is wrapped helically on the mandrel 10, and by correlating the travel of the carriage 13 with the rotation of the head stock 11, it can be arranged that the outer surfaces of the webs 16a are brought into contact to form the required helix.

At the outlet end of the guide means, the contacting webs 16a are gripped between flanges 34a of a pair of rollers 34 journalled in swinging brackets 35 which are pivoted to the block 30 and carriage 13 respectively. The rollers 34 are located in their operative positions by adjustable stops 36 on the brackets 35 engaging flats on projections 37 (see FIGURE 3) and they are held in this position by a releasable tie bolt 38 joining the brackets.

In operation, a tang 39 is formed at the leading end of the strip 16 and the strip 16 is fed through the channelling rollers 21, trimming shears 24 and guide means 30–33 until the tang 39 projects from the guide means, the clamping rollers 34 being in the position shown in FIGURE 3. The tang 39 is next secured to the head stock 11 by the clamp 14 and the parts are then as shown in FIGURE 3. The head stock 11 and mandrel 10 are now rotated and the carriage 13 is moved away from the head stock 11 so that wrapping of the channel-section strip 16a, 16b on the mandrel commences and after a short time the clamping rollers 34 are brought into the position of FIGURE 1 to grip the abutting webs 16a. The operation is now continued, and strip 16 is gradually drawn from the reel 15, shaped to channel form in the rollers 21, trimmed in the shears 24, and then continuously wrapped helically around the mandrel 10.

As the length of mandrel and wrapped strip projecting from the guide means increases clamps 40 are put in position to prevent separation of the webs 16a.

The mandrel 10 is supported in its length by vertically adjustable U-section plungers 41 which are housed in bores in bosses 42 on the carriage 13, and may also be supported by a steady 43 mounted on the machine bed and carrying a rotatable two-piece guide 44 which embraces the wound strip.

In one use of the machine, the mandrel 10 after being wrapped with a length of strip, is removed from the machine and the webs 16a are then welded together in a seam welding machine, not shown, the clamps 40 being removed as welding proceeds.

In another use, a tack or spot welding operation is effected to join the contacting webs at intervals of say 0.8 inch whilst the wrapping operation is proceeding, this welding being effected for instance close to the outlet of the guide means. On removal of the tube from the machine and after degreasing, the fin is double run seam-welded, the bore of the tube is sized by drawing through it a plug of suitable material, for instance nylon, and then the helical fin on the tube is trimmed to size.

Referring now to FIGURES 4 to 7, there is shown an alternative arrangement of the guide means. The guide means illustrated comprises a block 130 secured to the carriage 13 and having a heavy flange 130a overhanging the mandrel 10 and the channel section strip. The guides include a short guide strip 131 secured to the side edge of the flange 130a to project downwardly beyond it, guide strips 132, 133 secured to the undersurface of the flange 130a, a bar 134 secured to the carriage below the strips 132, 133, a spiral guide 135 which is secured to the side edge of the flange 130a beyond the end of the guide strip 131 and which has a shaped surface 135a to assist in initial deflection of the left hand web 16a into its correct helical path, a final guide 136 secured to the flange 130a at the outlet end of the guide means, and a guide block 137 which is mounted on the carriage 13 adjacent the final guide 136 and which has a channel 137a embracing the mandrel 10 and the wrapped strip.

In operation, the guide strip 131 and the edge 132a of the guide strip 132 maintains the left hand web 16a straight until the channel section strip, the base 16b of which is supported by the top surface of bar 134, almost reaches the point at which the surface 135a of the spiral guide engages and deflects the left hand web 16a into a helical path around the mandrel 10. The edge 132a of the guide strip 132 and the guide strip 133, which is somewhat shorter than the strip 132, lie one on each side of the right hand web 16a and support it until the left hand web 16a has almost completed its helical path to its final position in which the webs are in contact. The bar 134 supports the base portion 16b of the channel section strip but is set parallel to the mandrel 10 so that as the strip moves through the guide means the base 16b is displaced laterally of the bar 134 to allow it to wrap around the mandrel, the top surface 134a of the bar being substantially level with the top side of the mandrel. The channel 137a in the guide block 137 receives the almost completely wrapped strip and maintains the strip in position around the mandrel 10 during the end portion of the travel of the strip through the guide means. The final guide 136 by its surface portion 136a partially embraces the wrapped strip and has a surface portion 136b which co-operates with the extreme end of guide strip 132 to bring the webs 16a into contact.

The webs 16a are preferably stitch welded immediately after leaving the parts 132, 136 and subsequently double seam welded along the whole length permanently to secure them together.

The machine above described is especially suitable for the manufacture of finned casings of fuel elements for nuclear reactors. These casings can be used for fuel elements as described in U.S. Patent No. 3,096,264, granted July 2, 1963.

I claim:

1. A machine for use in maunfacturing a tube having an external helical fin from strip metal comprising a cylindrical mandrel supported to be rotated about its longitudinal axis, a clamp for one end of the strip mounted adjacent to but radially offset from one end of the mandrel and rotatable with the mandrel, a strip holder adjacent the mandrel radially offset therefrom, a carriage, both the carriage and the strip holder being mounted for movement parallel to the mandrel, means to form the strip to a channel section mounted on the carriage at its end remote from the clamp and guide means to feed the channel-section strip at an angle over the mandrel, the guide means being mounted on the carriage at its end adjacent the clamp, whereby by rotation of the mandrel and the clamp, the latter gripping one end of the strip, and by simultaneous displacement of the carriage in a direction away from the clamp, strip is drawn from the holder through the channel forming means and the guide means to be wrapped around the mandrel to bring the outer surfaces of the webs of the channel section together.

2. A machine according to claim 1 wherein the strip holder is a reel mounted on the carriage at its end remote from the clamp.

3. A machine according to claim 1 wherein the guide means comprises three parallel guide strips, the outer two of which are adapted to abut the two outward facing surfaces of the edge webs and the inner one of which is adapted to abut the inward facing surfaces of the two edge webs and the base web of the channel section, each of the guide strips having a direction inclined at a small angle to the longitudinal axis of the mandrel and extending from adjacent the channel-forming means to adjacent the point of closest approach of the guide strip to the mandrel, so that the outer guide strip which is closest to the mandrel is shorter than the other outer guide strip.

4. A machine according to claim 1 wherein there is additionally provided a spiral guide member mounted on the carriage near the termination of the said outer guide strip which is closest to the mandrel whereby in operation of the machine the edge web of the channel section strip which first approaches the mandrel is deflected by the spiral guide member into a spiral path around the mandrel to contact the outward facing surface of the other edge web.

5. A machine according to claim 1 wherein there is additionally provided on the carriage at the discharge end of the guide means a pair of rollers adapted to grip the contacting edge webs of the wrapped channel section strip and press them together.

6. A machine for use in manufacturing a tube having an external helical fin from strip metal comprising a cylindrical mandrel supported to be rotated about its longitudinal axis, a clamp for one end of the strip mounted adjacent to but radially offset from one end of the mandrel and rotatable therewith, a carriage mounted for movement parallel to the mandrel, a strip holder, means to form the strip to a channel section, both the strip holder and the channel-forming means being mounted on the carriage at its end remote from the clamp, guide means mounted on the carriage at its end adjacent the clamp and adapted to feed the channel-section strip at an angle over the mandrel and web-trimming means mounted on the carriage between the channel-forming means and the guide means so as to trim the webs of the channel section strip to be of equal length, the carriage being adapted for displacement in a direction away from the clamp simultaneously with rotation of the mandrel and the clamp whereby strip is drawn from the strip holder through the channel-forming and web-trimming means and the guide means to be wrapped around the mandrel to bring the outer surfaces of the webs together.

7. A machine for use in manufacturing a tube having an external helical fin from strip metal comprising a cylindrical mandrel supported to be rotatable about its longitudinal axis, a clamp for one end of the strip mounted adjacent but radially offset from one end of the mandrel, a carriage mounted for movement parallel to the mandrel, a strip holder, means to form the strip into a channel section, both the strip holder and the channel-forming means being mounted on the carriage at its end remote from the clamp, guide means mounted on the carriage at its end adjacent the clamp and adapted to feed the strip at an angle over the mandrel, the carriage being adapted for displacement in a direction away from the clamp simultaneously with rotation of the mandrel and the clamp, and welding apparatus located between the carriage and the clamp, whereby strip is drawn from the strip holder through the channel forming means and the guide means to be wrapped around the mandrel to bring the outer surfaces of the webs of the channel section together, the contacting webs being welded together by the welding apparatus as the helically wrapped strip leaves the guide means.

References Cited by the Examiner

UNITED STATES PATENTS

| | | | |
|---|---|---|---|
| 375,962 | 1/1888 | Stone | 93—80 |
| 2,693,632 | 11/1954 | Heussner | 113—33 |
| 2,786,435 | 3/1957 | Ellzey | 113—35 |

FOREIGN PATENTS

| | | |
|---|---|---|
| 65,991 | 12/1955 | France. |
| 973,626 | 9/1950 | France. |
| 520,772 | 5/1940 | Great Britain. |

CHARLES W. LANHAM, *Primary Examiner.*

NEDWIN BERGER, *Examiner.*